United States Patent
Yang et al.

(10) Patent No.: US 9,286,379 B2
(45) Date of Patent: Mar. 15, 2016

(54) DOCUMENT QUALITY MEASUREMENT

(71) Applicant: WAL-MART STORES, INC., Bentonville, AR (US)

(72) Inventors: Fan Yang, San Mateo, CA (US); Digvijay Singh Lamba, Sunnyvale, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 13/685,570

(22) Filed: Nov. 26, 2012

(65) Prior Publication Data
US 2014/0147048 A1    May 29, 2014

(51) Int. Cl.
   *G06K 9/46*      (2006.01)
   *G06F 17/30*     (2006.01)

(52) U.S. Cl.
   CPC .......... *G06F 17/30707* (2013.01); *G06K 9/46* (2013.01)

(58) Field of Classification Search
   CPC .............. G06Q 50/00; G06F 17/30616; G06F 17/3089; G06F 17/30247; G06F 17/30256; G06F 17/30; G06F 17/30705; G06F 17/30657; G06F 17/30707; G06F 17/30011; H04L 65/60; H04L 1/32133; G06K 9/62; G06K 9/6282; G06K 9/00456; G06K 9/6219; G06K 9/00442; G06K 9/228; G06K 9/00463; G06K 9/00677; G06K 9/6223; H04N 1/32133
   USPC .......... 382/103, 154, 159, 209, 204; 707/737, 707/741, 709, 102
   See application file for complete search history.

(56) References Cited

U.S. PATENT DOCUMENTS

| | | | |
|---|---|---|---|
| 5,675,788 A * | 10/1997 | Husick et al. ......................... 1/1 |
| 5,717,914 A * | 2/1998 | Husick et al. ......................... 1/1 |
| 5,909,510 A * | 6/1999 | Nakayama ..................... 382/229 |
| 6,601,026 B2 * | 7/2003 | Appelt et al. ..................... 704/9 |
| 8,225,190 B1 * | 7/2012 | Bharat et al. .................. 715/200 |
| 8,699,789 B2 * | 4/2014 | Gordo et al. .................. 382/159 |
| 2004/0024739 A1 * | 2/2004 | Copperman et al. ............. 707/1 |
| 2006/0235843 A1 * | 10/2006 | Musgrove et al. ................ 707/6 |
| 2008/0070209 A1 | 3/2008 | Zhuang |
| 2008/0195601 A1 * | 8/2008 | Ntoulas et al. ..................... 707/5 |
| 2009/0116756 A1 * | 5/2009 | Neogi et al. .................. 382/224 |
| 2009/0210406 A1 * | 8/2009 | Freire et al. ....................... 707/5 |

(Continued)

FOREIGN PATENT DOCUMENTS

WO    WO 2007/101263    9/2007

OTHER PUBLICATIONS http://www.slideshare.net/janvosecky/twitter-quality.

*Primary Examiner* — Barry Drennan
*Assistant Examiner* — Aklilu Woldemariam
(74) *Attorney, Agent, or Firm* — Alan W. Watts; Bryan Cave LLP

(57) ABSTRACT

Systems and methods are disclosed herein for ranking the quality of documents, such as documents shared or referenced in postings by users. For a first set of documents quality attributes that are indicative of quality or lack of quality are identified. Ratings of the quality of the first set of documents are received. Classifiers are associated with each document and the ratings and quality attributes for each attribute used to train class-specific models corresponding to the classifiers. Subsequently received documents are then classified and corresponding quality attributes are evaluated using the corresponding class-specific model in order to rank the quality of the document.

20 Claims, 4 Drawing Sheets

(56) References Cited

U.S. PATENT DOCUMENTS

| | | | |
|---|---|---|---|
| 2009/0300051 A1* | 12/2009 | Adams et al. | 707/102 |
| 2009/0307086 A1* | 12/2009 | Adams et al. | 705/14.49 |
| 2010/0179933 A1* | 7/2010 | Bai et al. | 706/12 |
| 2011/0022602 A1 | 1/2011 | Luo | |
| 2011/0072023 A1* | 3/2011 | Lu | 707/741 |
| 2012/0102113 A1 | 4/2012 | Chartier | |
| 2012/0131139 A1 | 5/2012 | Siripurapu | |
| 2012/0166439 A1* | 6/2012 | Poblete et al. | 707/737 |
| 2012/0226678 A1 | 9/2012 | Park | |
| 2012/0239637 A9 | 9/2012 | Prakash | |

* cited by examiner

DOCUMENT QUALITY MEASUREMENT

BACKGROUND

1. Field of the Invention

This invention relates to systems and methods for characterizing the quality or interestingness of shared documents and other data.

2. Background of the Invention

Many attempts have been made to automatically classify documents or otherwise identify the subject matter of a document. In particular, search engines seek to identify documents that a relevant to the terms of a search query based on determinations of the subject matter of the identified documents. Another area in which classification of documents is of importance is in the realm of social media content. Millions of users generate millions of documents in the form of social media posts every day. In order to make use of this information, the documents must often be classified or otherwise sorted. As for search engines, "spam" postings that are automatically generated or that otherwise contain irrelevant content should be removed.

Although some automatic spam detection methods are quite accurate they are not a substitute for human judgment. Often documents identified as important using automated methods are completely irrelevant. In addition, these methods are subject to manipulation by "spammers" that manipulate the word usage of content to obtain a desired classification but provide no useful content.

Of course, with such a large volume of content, human evaluation of documents is not practical. The systems and methods described herein provide improved methods for incorporating both automated evaluation of document quality and human judgment.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
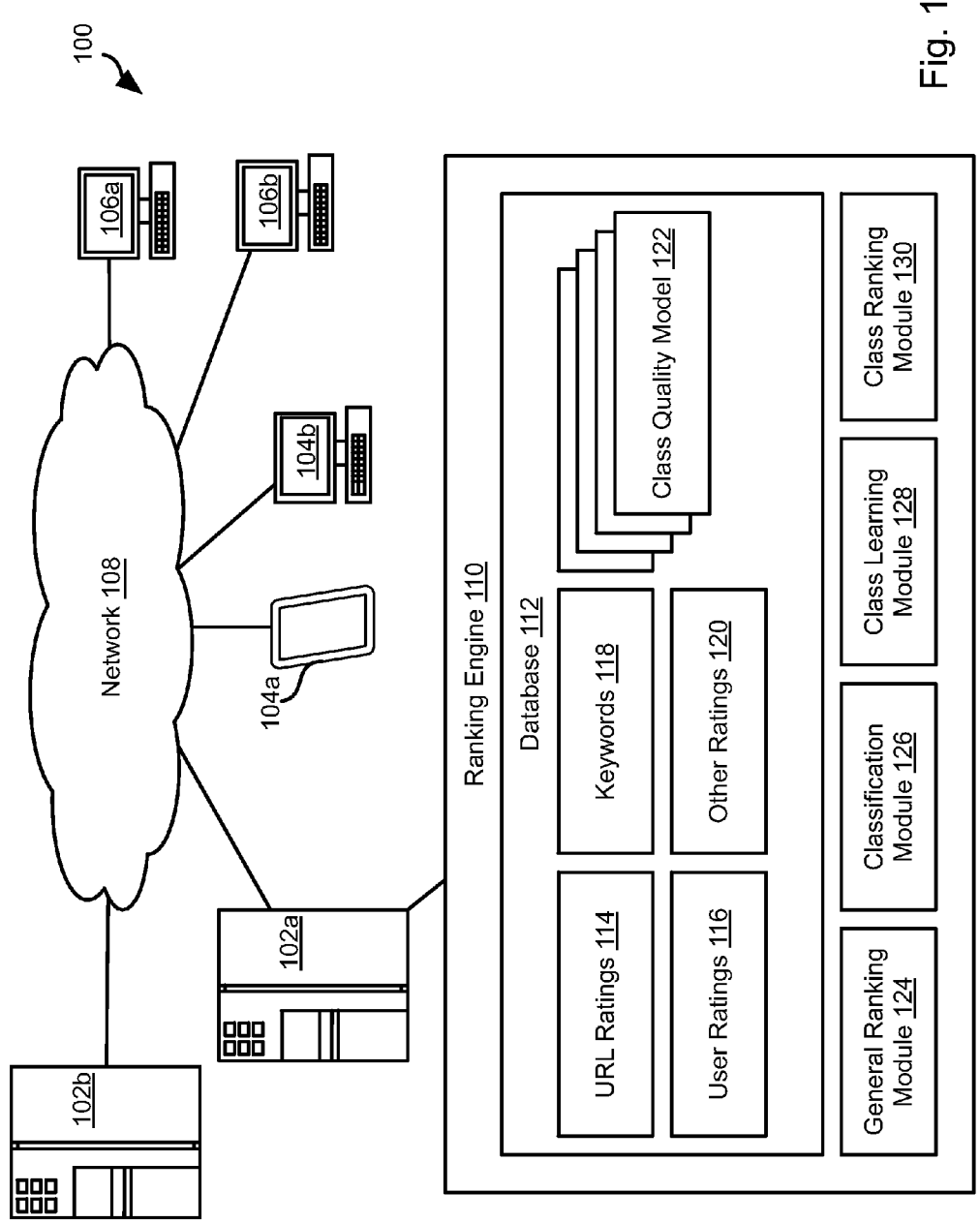
FIG. 1 is a schematic block diagram of a system for methods in accordance with embodiments of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

FIG. 1 illustrates a system 100 in which methods described hereinbelow may be implemented. The system 100 may include one or more server systems 102a, 102b that may each be embodied as one or more server computers each including one or more processors that are in data communication with one another. The server systems 102a, 102b may be in data communication with one or more user computers 104a, 104b and one or more crowdsourcing workstations 106a, 106b. In the methods disclosed herein, the user computers 104a, 104b and crowdsourcing workstations 106a, 106b may be embodied as mobile devices such as a mobile phone or tablet computer.

In some embodiments, some or all of the methods disclosed herein may be performed using a desktop computer or any other computing device as the user computers 104a, 104b or crowdsourcing workstations 106a, 106b. For purposes of this disclosure, discussion of communication with a user or entity or activity performed by the user or entity may be interpreted as communication with a computer 104a, 104b associated with the user or entity or activity taking place on a computer associated with the user or entity.

Some or all of the server 102, user devices 104a, 104b, and crowdsourcing workstations 106a, 106b may communicate with one another by means of a network 108. The network 108 may be embodied as a peer-to-peer wireless connection between devices, a connection through a local area network (LAN), WiFi network, the Internet, or any other communication medium or system.

The server system 102a may be associated with a merchant, or other entity, providing classification services of documents. For example, the server system 102a may host a search engine or a site hosted by a merchant to provide access to information about products and user opinions about products. The server system 102b may implement a social networking site that enables the generation of content by a user. For example, the server system 102b may store, provide access to, or enable generation of, social media content for a site such as Facebook™, Twitter™, FourSquare™, LinedIn™, or other social networking or blogging site that enables the posting of content by users.

A server system 102a may host a ranking engine 110. The ranking engine 110 may host a database 112 storing data suitable for use in accordance with the methods disclosed herein. For example, the database 112 may store uniform resource locator (URL) ratings 114, user ratings 116, keywords 118, and one or more other ratings 120. The database 112 may also include parameters defining one or more class quality models 122.

The URL ratings 114 may include rankings of the quality of content associated with a URL, including a domain, or a URL referencing a particular area of a domain, or the like. A quality ranking may reflect the likelihood that a URL associated with a URL rating 114 is likely to contain quality content. The method by which a URL rating 114 is updated is described in greater detail below.

User ratings 116 may include rankings of the quality of content associated with a particular user, such as a particular user handle or identifier on a social media site or other identifier of a user such as an email address, actual name, or the like. The user ratings 116 may reflect the quality of postings or other documents generated or shared by the user. The method by which the user ratings 116 are updated is described in greater detail below.

The keywords 118 may include keywords or other attributes of text that are indicative of quality or lack of quality in a document. For example, keywords 118 may include blacklists of words that indicate low quality, such as profanity or other inappropriate language, text previously identified as included in "spam," or the like. Keywords 118 may also include white lists of words that are indicative of quality content. Keywords 118 of a whitelist or blacklist may be represented using a characterizations of text or patterns of text indicative of low quality content. Text may be described using regular expressions, co-occurrence patterns, separation distance of terms, or any other characterization of text. Keywords 118 may also include a metric associated therewith indicating the degree to which a keyword is indicative of low quality for a blacklist term or the degree to which a keyword is indicative of high quality for a whitelist term.

In some embodiments, keywords 118 may be grouped. For example a group of keywords may be used to indicate the quality or lack of quality for a general audience. Other groups of keywords may each include keywords that indicate quality or lack of quality of the keywords in documents manifestly related to a particular class.

Other ratings of other aspects of a document such as an originator of a document, host of a document, time of posting of a document, content of a document, links included in the document, type of content (video, text, audio), amount of content, format content, attributes of a title of a document, attributes of a opening paragraph of the content, attributes of a closing paragraph of the content, or any other aspect of a document.

The class quality models 122 contain parameters and other data effective to define the state of a machine-learning model. As known in the art a machine-learning algorithms are trained to take input data and provide an output. A training set of input and output data may be used to train the algorithm in order to yield as close as possible a desired output. Any type of machine-learning technique may be used, such as logistic regression, decision tree, association rule learning, Bayesian networks, reinforcement learning, representation learning, or the like. In particular, the decision tree learning algorithm has been found to be particularly useful. Each class quality model 122 may store the state of a machine-learning model for a particularly class. That is, the class quality model 122 for a class may be trained using input documents and ratings of the quality of input documents where the content of the input documents manifestly relate to the class.

The ranking engine 110 may include one or more modules for executing methods as described herein. For example, the ranking engine 110 may include a general ranking module 124, a classification module 126, a class learning module 128, and a class quality ranking module 130.

A general ranking module 124 is operable to determine the likelihood that a document would be interesting to the general public. The classification module 126 is operable to associate a document with one or more classes. The class learning module is operable to train a class quality model 122 using documents identified as belonging to a class by the classification module 126 and ratings of such documents. The class ranking module 130 is operable to rank documents using the class quality model 122 corresponding to the document. The ranking assigned to a document may be used for any purpose, such as to filter out low quality content. The methods performed using the above-mentioned modules are described in greater detail below.

Figure 2:
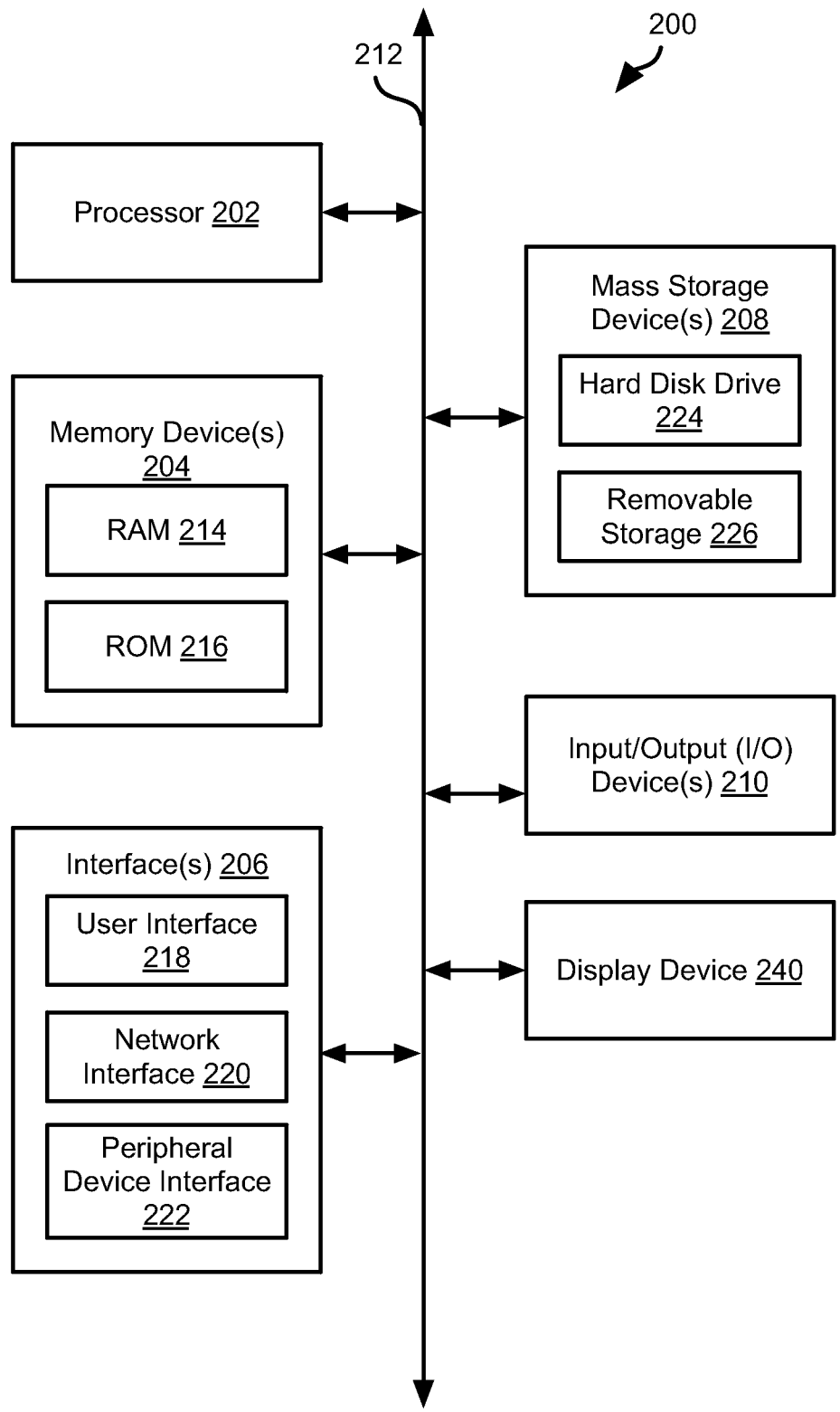
FIG. 2 is a block diagram of a computing device suitable for implementing embodiments of the present invention.

FIG. 2 is a block diagram illustrating an example computing device 200. Computing device 200 may be used to perform various procedures, such as those discussed herein. A server system 102*a*, 102*b*, user computer 104*a*, 104*b*, and crowdsourcing workstation 106*a*, 106*b* may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
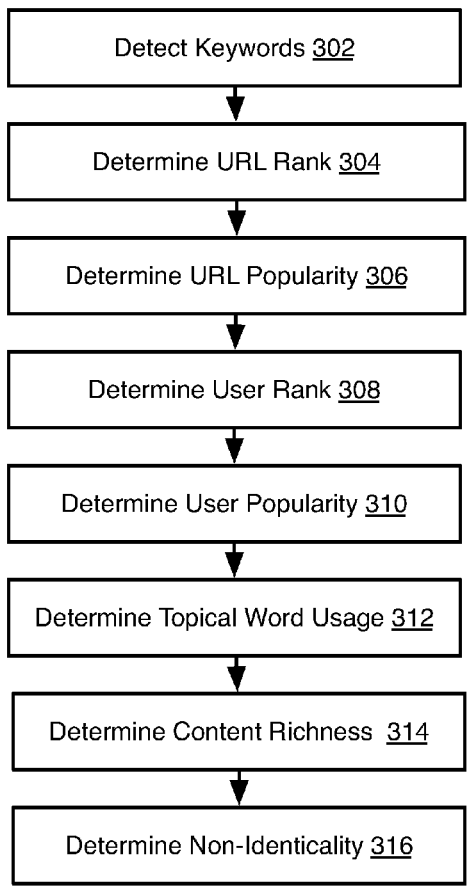
FIG. 3 is a process flow diagram of a method for evaluating the quality of a document in accordance with an embodiment of the present invention.

FIG. 3 illustrates a method 300 for identifying quality attributes for a document. For purposes of the method 300 a document may include both a document and other documents referenced by the document, such as by means of a URL included in the document. Quality attributes may be viewed as those that are indicative of a quality or lack of quality of a document. Quality may be viewed as the amount of interesting information that a document contains or the importance of the information that a document contains.

FIG. 3 illustrates a method for identifying quality attributes of a document that are subsequently processed according to methods described herein to generate a quality estimate. The steps of the method 300 illustrate examples of attributes that may be determined. In some embodiments, less than all of these attributes may be determined and used or other attributes may be added and used in accordance with subsequent processing described herein. Prior to analyzing a document and documents referenced thereby, either of these may be "dechromed," that is, by removing content unrelated to the content of the article, such as banner ads, menu bars, standard links, and the like.

The method 300 may include detecting 302 keywords. This may include detecting words in precompiled whitelists, blacklists, class-specific whitelists, class-specific blacklists, or other lists of keywords. The ranking of a URL at which the document is located, referenced by the document, or both, may be determined 304. A quality ranking of a URL may be computed based on past rankings of documents associated with the URL, including one or both of documents referenced by the URL and documents citing the URL. For purpose of this disclosure a URL that is ranked may include a complete URL to a specific document, a web domain, or portion of a web domain. In some embodiments, only keywords encountered in specific parts of a document, such as the title may be evaluated to detect 302 keywords. In other embodiments, words in a title are detected separately and are used as a separate quality attribute as keywords in the body of a document.

The method 300 may include determining 306 one or both of a popularity of a URL referencing a document and a URL referenced by a document. A score for both types of URLs associated with a document may combined, or weighted and combined, to determine 306 a URL popularity of a document. In some embodiments, only one of these scores is used, a larger of the two scores is used, or the smaller of these scores is used. The popularity score of a URL may be based on one or more of a traffic received by the URL in a given period of time (e.g. number of unique visitors per day or other time period), the number of times the URL is referenced in a social media or other posting in a recent time period, the number of web pages that reference the URL, or other metric of URL popularity.

The method 300 may include determining 308 a quality rank of a user. A quality rank of a user may be based on a quality associated with content generated by the user, or otherwise referenced in content generated by the user. The popularity of a user may also be determined 310. The popularity of a user may be based on one or more of a number of followers of the user, a number of times content generated by a user is shared by others (e.g. retweeted), a number of times the user is referenced (e.g. by means of a username or handle) in other content. As known in the art, various means exist for ranking the influence of a social media user. The popularity of a user may be based in whole or in part on such a metric of influence.

The method 300 may include determining 312 the topical word usage of a document, including documents referenced by the document such as by means of a URL. Determining 312 topical word usage may include detecting the relevance of a document, including documents referenced thereby, to any topic. The embodiments disclosed herein find particular application in detecting quality content relating to particular products. Accordingly, detecting topical word usage may include detecting the frequency of mentions of a product name and its synonyms.

For each product referenced, the total number of times that product or its synonyms is referenced in the document and documents referenced thereby may be determined. In some embodiments, words in the title may be given more weight or considered separately when determining word usage of a document. For example, a number of times a product is mentioned in a title may be considered exclusive of the text of the document in some embodiments. In others, both product mentions in the title and body of document may be considered with mentions in the title given additional weight.

In some embodiments, determining 312 the topical usage may include a broader definition. For example, the word usage of concepts referenced in the article may be compared to the words or concepts referenced in an article associated with each topic identified in the document and documents referenced thereby. The topical word usage may then be determined according to a similarity of the concept or word usage between the document and these topical articles.

The method 400 may include determining 314 content richness of the document and documents referenced thereby. Content richness may be measured as one or both a quantity and variety of content in a document and documents referenced thereby. For example, content richness may be characterized based on a number of paragraphs, a number of photographs, or the like. Content richness may also be characterized by such metrics as the number of times the document or documents referenced thereby have been cited by other users in postings (e.g. retweeted), how many comments a document has received, or other metric of user interest. Some or all of these metrics may be reported separately or combined to generate a richness score for the document.

The method 300 may include determining 316 non-identicality of the document and documents referenced thereby. Articles that simply quote content from a canonical source such as a manufacturers product description or a retailer's advertisement generally do not contribute useful information. Accordingly, a document and documents referenced thereby may be compared to canonical documents for topics, particularly products, referenced therein. Where a document or document referenced thereby is identical to, or does not include significant information other than, a canonical article, then this fact may be noted and used when evaluating quality of the document.

Figure 4:
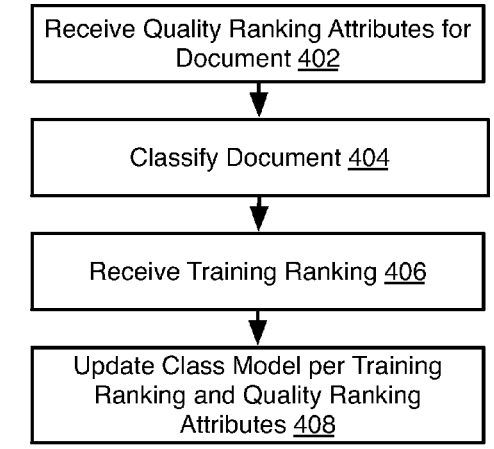
FIG. 4 is a process flow diagram of a method for training a category-specific quality model in accordance with an embodiment of the present invention.

FIG. 4 illustrates a method 400 for ranking the content of a document using the quality attributes determined according to the method 300 and possibly other quality attributes. The method 400 may include receiving 402 the document quality attributes and classifying 404 the document. Classifying 404 the document may include assigning the document to at least one node of a taxonomy. A classification technique may be used. For example, the document may be classified according to one of the methods disclosed in U.S. patent application Ser. No. 13/300,524, now U.S. Pat. No. 8,595,234 ("the '234 patent"), which is hereby incorporated herein by reference in its entirety. In particular embodiments, a map-reduce framework may be used to perform the classification 404, for example. The '234 patent describes a process wherein:

Whitelist, extracted from the taxonomy stored in database, is a list of all of the concepts that are included in the taxonomy. Textual representation detector is configured to perform a greedy match against the document using whitelist. Each match is included in a list of candidate textual representations.

The '234 patent further describes transforming the candidate textual representations to concepts in a taxonomy space:

In various embodiments, mapper determines the set of all concepts to which a particular textual representation maps. Each mapping is associated with a mapping vector. Mapping vectors are either of type "unambiguous" or type "ambiguous." A mapping vector is of type "unambiguous" only if a given textual representation maps to a single concept. Otherwise, it is of type ambiguous. A mapping vector also stores additional information, such as a pointer to the textual representation in the document, the conceptID of the mapped concept, the feature vector of the textual representation, and a strength value that indicates a confidence in the mapping. As will be described in more detail below, in some embodiments the mappings initially created by mapper are pruned through a series of refining actions.

The '234 patent further describes selecting a portion of these concepts as representative of the document:

Even after the scoring and pruning actions described above have been performed, for a given document, it is possible that hundreds (or more) of textual representations and associated concepts remain as candidates. Typically, only a handful of the top textual representations and/or concepts are needed.

Ranker is configured to rank the concepts remaining in consideration after the above processing/pruning has been performed. One approach is to use a scoring function s that computes a score given a concept feature vector. In various embodiments, what weights to apply to the various signals included in the concept feature vector are empirically determined and then tunes using linear regression. In various embodiments, only a subset of the signals is used (e.g., a combination of the document similarity score and linkworthiness/popularity/freshness signals). For a given document, a threshold/cutoff is applied to limit the final list of concepts to an appropriately manageable size for consumption by an application. Concepts having a score above the threshold (and their corresponding textual representations) are provided as output (i.e., "entities").

The document and documents referenced thereby may then be presented to a user for rating. The rating may be in the context of a crowd sourcing service or system whereby analysts at crowd sourcing workstations 106a, 106b. The rating may be on a scale, e.g. 1-5, with one end of the scale indicating uninteresting and the other indicating interesting content. Alternatively, the rating may be a simple binary rating with one possible response indicating interesting content and the other indicating uninteresting content. The analyst may be prompted to provide a general rating of how interesting the content is or to provide a rating as to how interesting the content is to the class identified for the document.

The rating from the analyst may be received 406 and the rating as well as the document and the quality attributes may then be used to update 408 a model corresponding to the class identified 404 for the document. Updating the model may include adjusting the internal state of the model such that the quality estimate output by the model based on analysis of one or both of the document and quality attributes corresponds as close as possible to the rating provided by the analyst.

Figure 5:
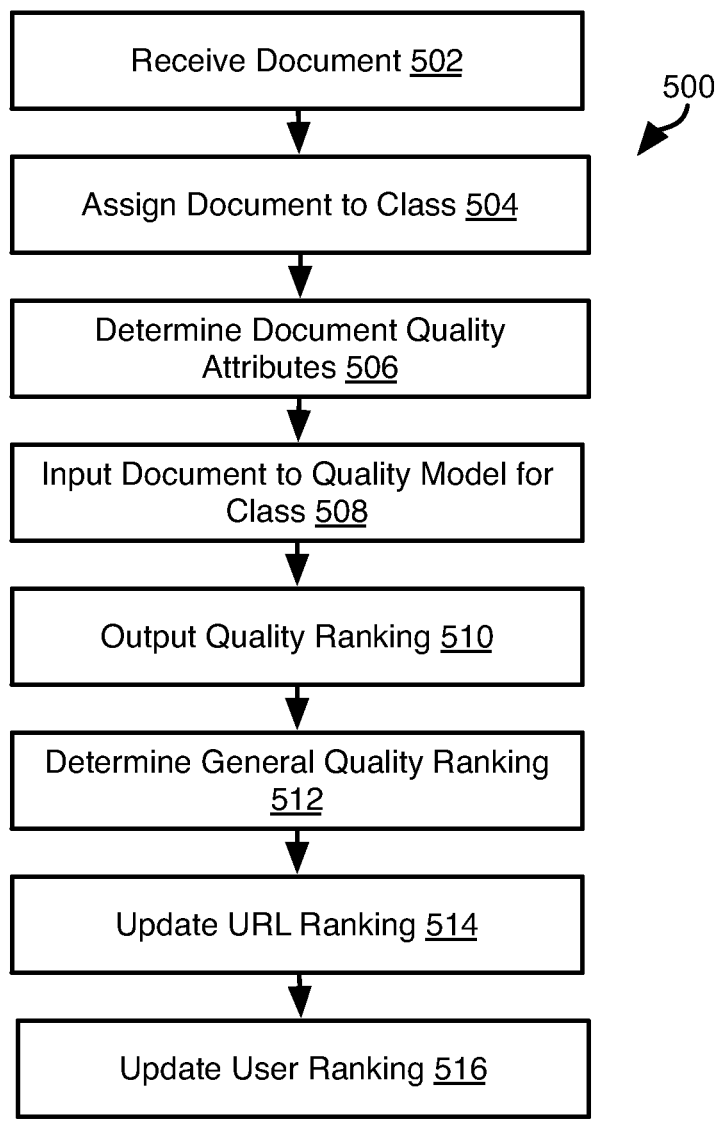
FIG. 5 is a process flow diagram of a method for rating the quality of documents in accordance with an embodiment of the present invention.

FIG. 5 illustrates a method 500 for estimating the quality of a document using class-specific models as trained according to the method 400. The method 500 may include receiving a document and retrieving documents referenced by the document, such as web pages referenced by links included in the document. The document and associated other documents may then be assigned 504 to a class, such as using any of the means described above for classifying documents in the method 300.

The document quality attributes for the document and other associated documents may then be determined 506. This may include determining some or all of the attributes described above with respect to the method 300. One or both of the quality attributes and the document may then be input to the class-specific model corresponding to the assigned 504 class. The model may then operate upon this input data and output a quality ranking 510. In some embodiments, a general quality model that uses training data for documents of multiple classes, or for all classes evaluated, may be used to determine 512 the quality of the document using the same document and quality attributes.

The quality score assigned to a document may be used to update 516 or determine a quality ranking associated within one or more of the URL referencing a document and a URL reference by a document. The quality score may also be used to generate or update 516 a quality ranking of a user that generated or shared the document. For example, an average rating may be maintained based on all of the rankings for documents associated with a URL or user. Alternatively, only an average of the most recent, e.g. the last N or those within a recent time window, quality rankings may be used as the ranking of a user or URL. Any combination of the rankings of a user or URL over time may be used as the ranking of the user or URL and this value may be updated 514, 516 periodically or as each new ranking is determined 512.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for evaluating document quality, the method comprising:

for a first plurality of documents, performing for each document of the first plurality of documents:
identifying, by a computer system, quality attributes associated with the each document of the first plurality of documents, the quality attributes including characterizations of usage of the each document of the first plurality of documents, relevance of text in the each document of the first plurality of documents to one or more topics, and quantity of text and media;
associating, by the computer system, a classifier from a plurality of classifiers with the each document of the first plurality of documents in accordance with relevance of content of the each document of the first plurality of documents to the classifier, by selecting the classifier from a taxonomy of concepts as being representative of the each document of the first plurality of documents by evaluating meanings of textual representations within the each document of the first plurality of documents; and
receiving, by the computer system, a ranking of the each document of the first plurality of documents;
training a plurality of class-specific models each corresponding to a classifier of the plurality of classifiers by, for each classifier of the plurality of classifiers, training, by the computer system, a class-specific model of the plurality of class-specific models corresponding to the each classifier of the plurality of classifiers according to the ranking of the first plurality of documents associated with the each classifier of the plurality of classifiers and both of the quality attributes associated with documents of the first plurality of documents associated with the each classifier of the plurality of classifiers and the content of the documents of the first plurality of documents associated with the each classifier of the plurality of classifiers; and
for a second plurality of documents, performing, by the computer system, for each document of the second plurality of documents:
identifying quality attributes associated with the each document of the second plurality of documents;
associating a classifier with the each document of the second plurality of documents in accordance with relevance of content of the each document of the second plurality of documents to the classifier;
inputting, by the computer system, the each document of the second plurality of documents to a selected class-specific model of the plurality of class-specific models corresponding to the classifier associated with the each document of the second plurality of documents;
ranking, by the computer system, each document of the second plurality of documents according to the selected class-specific model using as inputs both of the quality attributes and the content of the each document of the second plurality of documents.

2. The method of claim 1, further comprising filtering the second plurality of documents in accordance with rankings of the documents of the second plurality of documents.

3. The method of claim 1, wherein identifying quality attributes of a document of one or both of the first and second plurality of documents comprises identifying popularity of a domain that is at least one of referenced in the document and a host of the document.

4. The method of claim 1, wherein identifying quality attributes of a document of one or both of the first and second plurality of documents comprises retrieving a quality ranking of a domain that is at least one of referenced in the document and a source of the document.

5. The method of claim 1, wherein ranking a document of the second plurality of documents according to a class-specific model corresponding to the classifier associated further comprises updating a quality ranking of a domain associated with the document of the second plurality of documents in accordance with the ranking of the document of the second plurality of documents.

6. The method of claim 1, wherein identifying quality attributes of a document of one or both of the first and second plurality of documents comprises identifying popularity of a user that posted the document.

7. The method of claim 1, wherein identifying quality attributes of a document of one or both of the first and second plurality of documents comprises retrieving a quality ranking of a user that is at least one of referenced in the document and a source of the document.

8. The method of claim 1, wherein ranking a document of the second plurality of documents according to the class-specific model corresponding to the classifier associated further comprises updating a quality ranking of a user associated with the document of the second plurality of documents in accordance with the ranking of the document of the second plurality of documents.

9. The method of claim 1, wherein identifying quality attributes of a document of one or both of the first and second plurality of documents comprises identifying a richness of content of the document.

10. The method of claim 1, wherein identifying the richness of content of the document comprises identifying at least one of an amount of content and a variety of types of content.

11. The method of claim 1, wherein identifying the richness of content of the document comprises identifying similarity between the content of the document and a canonical article, wherein the document is deemed to be less rich the more similar the document is to the canonical article.

12. The method of claim 11, wherein the canonical article is a product description authored by a manufacturer of a product.

13. The method of claim 11, wherein the canonical article is a product description authored by a retailer of a product.

14. The method of claim 1, wherein identifying quality attributes of a document of one or both of the first and second plurality of documents comprises identifying occurrences in keywords in one of the document and a document referenced by the document.

15. The method of claim 1, wherein training the class-specific model corresponding to the classifier associated comprises training a decision tree model.

16. A system for rule generation, the system comprising one or more processors and one or more memory devices operably coupled to the one or more processors, the one or more memory devices storing executable and operational data effective to cause the one or more processors to:
for a first plurality of documents, perform for each document of the first plurality of documents:
identifying quality attributes associated with the each document of the first plurality of documents, the quality attributes including characterizations of usage of the each document, relevance of text in the each document to one or more topics, and quantity of text and media;
associating a classifier from a plurality of classifiers with the each document of the first plurality of documents in accordance with relevance of content of the each document of the first plurality of documents to the classifier, by selecting the classifier from a taxonomy of concepts as being representative of the each document by evaluating meanings of textual representations within the each document; and
receiving a ranking of the each document of the first plurality of documents;
training a plurality of class-specific models each corresponding to a classifier of the plurality of classifiers by, for each classifier of the plurality of classifiers, training each class-specific model of the plurality of class-specific models corresponding to the each classifier according to both of the quality attributes associated with the each document of the first plurality of documents associated with the each classifier and the content of the each documents of the first plurality of documents associated with the each classifier; and
for a second plurality of documents, perform for each document in the second plurality of documents:
identifying quality attributes associated with the each document of the second plurality of documents;
associating a classifier with the each document of the second plurality of documents in accordance with relevance of content of the each document of the second plurality of documents to the classifier;
inputting the each document of the second plurality of documents to a selected class-specific model of the plurality of class-specific models corresponding to the classifier associated with the each document;
ranking the each document of the second plurality of documents according to the selected class-specific model using as inputs one or both of the quality attributes and the content of the each document of the second plurality of documents.

17. The system of claim 16, wherein the executable and operational data are further effective to cause the one or more processors to filter the second plurality of documents in accordance with rankings of the each document of the second plurality of documents.

18. The system of claim 16, wherein the executable and operational data are further effective to cause the one or more processors to rank a document of the second plurality of documents according to the class-specific model corresponding to the classifier associated by updating a quality ranking of a domain associated with the each document of the second plurality of documents in accordance with the ranking of the each document of the second plurality of documents.

19. The system of claim 16, wherein the executable and operational data are further effective to cause the one or more processors to rank a document of the second plurality of documents according to the class-specific model corresponding to the classifier associated by updating a quality ranking of a user associated with the each document of the second plurality of documents in accordance with the ranking of the each document of the second plurality of documents.

20. The system of claim 16, wherein the executable and operational data are further effective to cause the one or more processors to train the class-specific model corresponding to the classifier associated comprises training a decision tree model.

\* \* \* \* \*